United States Patent
Byron et al.

(10) Patent No.: US 8,319,136 B2
(45) Date of Patent: Nov. 27, 2012

(54) ARCING FAULT AND ARC FLASH PROTECTION SYSTEM HAVING A HIGH-SPEED SWITCH

(75) Inventors: Eldridge R. Byron, Murfreesboro, TN (US); Gary W. Scott, Mount Vernon, IA (US); Carlton Rodrigues, Mount Juliet, TN (US); Jim Ramsey, Murfreesboro, TN (US); Philippe Picot, Grenoble (FR)

(73) Assignee: Schneider Electric USA, Inc., Palatine, IL (US)

( * ) Notice: Subject to any disclaimer, the term of this patent is extended or adjusted under 35 U.S.C. 154(b) by 212 days.

(21) Appl. No.: 12/825,414

(22) Filed: Jun. 29, 2010

(65) Prior Publication Data

US 2011/0315662 A1    Dec. 29, 2011

(51) Int. Cl.
*H01H 33/66* (2006.01)
(52) U.S. Cl. .......................................... 218/126
(58) Field of Classification Search ........... 218/126–130
See application file for complete search history.

(56) References Cited

U.S. PATENT DOCUMENTS

| | | | | |
|---|---|---|---|---|
| 3,303,376 A | | 2/1967 | Lafferty et al. | 313/148 |
| 3,465,192 A | * | 9/1969 | Lafferty | 313/547 |
| 3,465,205 A | * | 9/1969 | Lafferty | 315/330 |
| 3,581,142 A | * | 5/1971 | Boxman | 313/162 |
| 3,816,798 A | | 6/1974 | Lafferty | 315/330 |
| 3,825,789 A | * | 7/1974 | Harris | 218/130 |
| 3,852,555 A | * | 12/1974 | Schuocker et al. | 218/127 |
| 3,889,079 A | * | 6/1975 | Emmerich et al. | 218/136 |
| 3,997,748 A | * | 12/1976 | Harris | 218/123 |
| 4,086,459 A | * | 4/1978 | Rich | 218/126 |
| 4,320,269 A | * | 3/1982 | Rich et al. | 218/126 |
| 4,427,857 A | * | 1/1984 | Abe et al. | 218/129 |

(Continued)

FOREIGN PATENT DOCUMENTS

CN        201274375        7/2009

OTHER PUBLICATIONS

International Search Report, PCT/US2011/039920, mailed Sep. 28, 2011 (5 pages).
International Written Opinion, PCT/US2011/039920, mailed Sep. 28, 2011 (7 pages).
E2V Technologies A1A—Three—Electrode Spark Gap Preamble Issued May 4, 2003 (7 pages).

(Continued)

*Primary Examiner* — Truc Nguyen
(74) *Attorney, Agent, or Firm* — Nixon Peabody LLP

(57) ABSTRACT

A high-speed arc terminator for an electrical power distribution system includes a sealed, evacuated housing, and a controllable mechanical switch having first and second electrically conductive contacts enclosed within the housing and adapted to be coupled to the power distribution system outside the housing. A trigger conductor extends into the housing and has an exposed end near the gap between the contacts when the contacts are in the open position. At least one of the contacts is movable between an open position in which the contacts are separated by a gap, and a closed position in which the contacts engage each other, and an operating mechanism is provided for moving the at least one contact between the open and closed positions. A high voltage source is controllably coupled to the trigger conductor for supplying a high-voltage pulse to the trigger conductor in response to the detection of an arcing fault. The high-voltage pulse produces an arc within the gap between the contacts, to shunt fault current from the power distribution system across the gap, from one of the contacts to the other, before the contacts engage each other.

18 Claims, 4 Drawing Sheets

U.S. PATENT DOCUMENTS

| | | | |
|---|---|---|---|
| 5,933,308 A | 8/1999 | Garzon | |
| 6,141,192 A | 10/2000 | Garzon | |
| 7,173,208 B2 | 2/2007 | Harada et al. | |
| 7,239,490 B2 | 7/2007 | Benke | |
| 7,499,251 B2 | 3/2009 | Byron | |
| 2003/0231453 A1 | 12/2003 | Shea | 361/220 |
| 2008/0239592 A1 | 10/2008 | Roscoe et al. | |
| 2008/0253040 A1 | 10/2008 | Asokan et al. | |

OTHER PUBLICATIONS

Square D Schneider Electric "Arc Terminator™ Arc Extinguishing System for Use in Medium Voltage Switchgear" Issued 2001-2002 (2 pages).

Square D " Arc Terminator—Arc Extinguishing System for use in Medium Voltage Switchgear Instruction Bulletin 6055-52" Issued Aug. 2007 (100 pages).

* cited by examiner

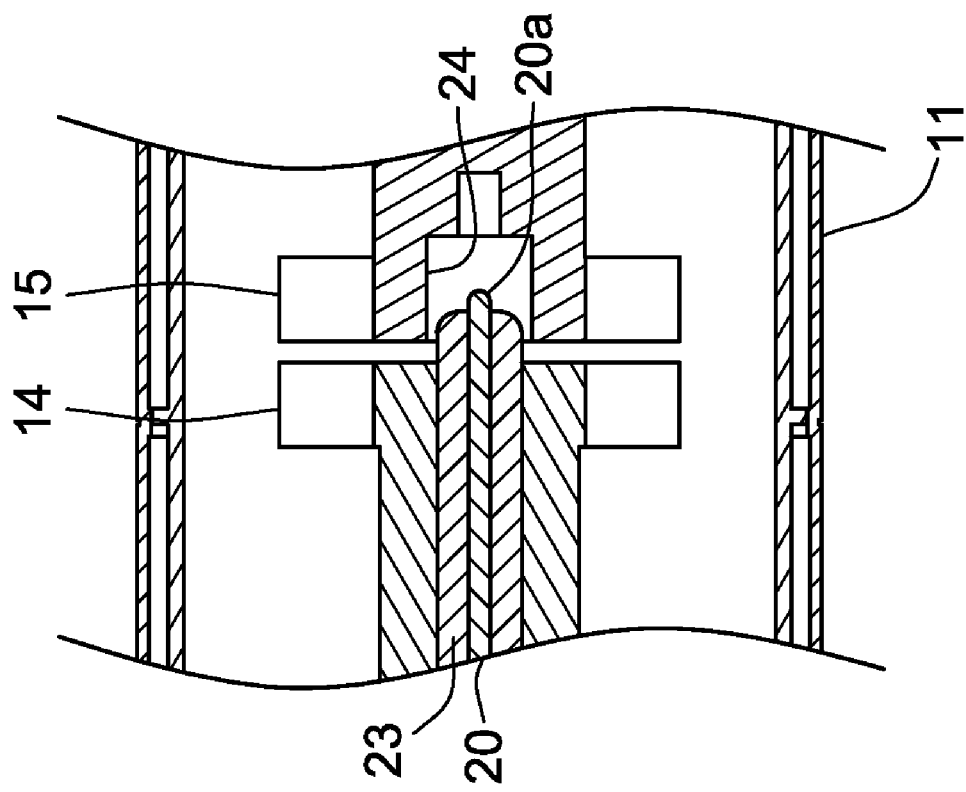
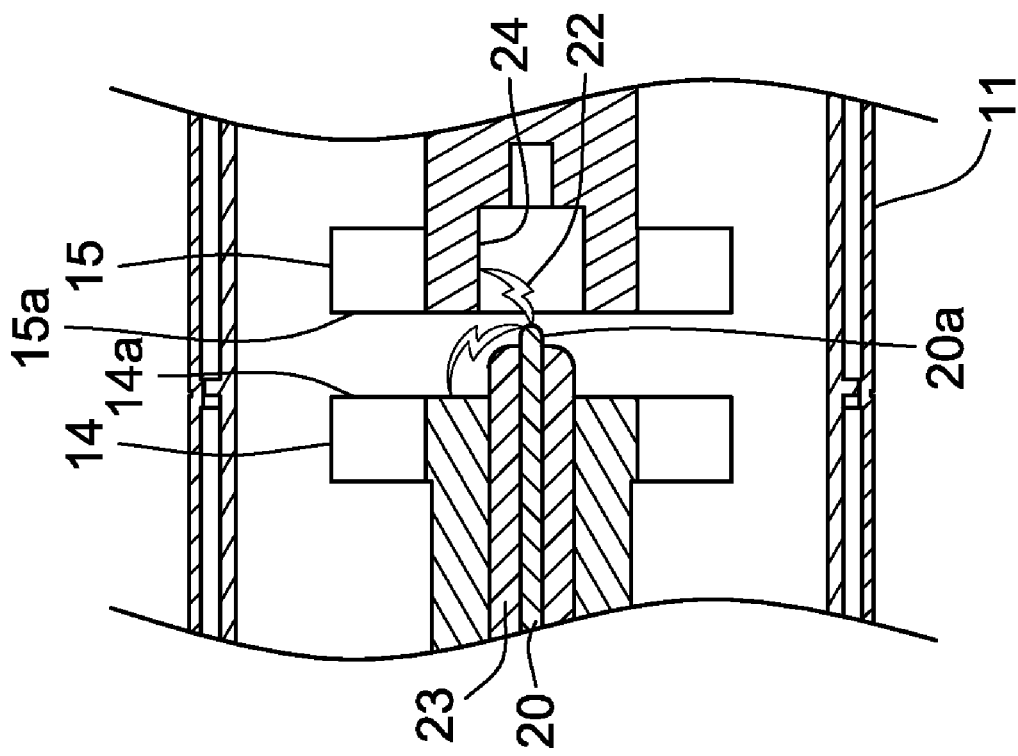

US 8,319,136 B2

ARCING FAULT AND ARC FLASH PROTECTION SYSTEM HAVING A HIGH-SPEED SWITCH

FIELD OF THE INVENTION

This invention is directed generally to protective devices for electrical switch gear and, more particularly, to an arcing fault protection system having a high-speed switch for diverting an arc.

BACKGROUND OF THE INVENTION

Switchgear enclosures are commonly employed in electrical power distribution systems for enclosing circuit breakers and switching equipment associated with the distribution system. The circuit breakers are used to interrupt electric power in response to hazardous current overloads in a protected circuit.

In addition to current overloads, the switchgear enclosures may also encounter hazardous conditions known as primary arcing faults Primary arcing faults are typically caused by corroded, worn or aged wiring, loose connections, overloading, lightning strikes, etc. Especially in medium or high-voltage power distribution systems, the ionized gas associated with primary arcing faults may be released at pressures and temperatures sufficient to severely damage or destroy the switchgear equipment and/or cause severe injuries to operating personnel. In addition to the ionized gases, there is a large release of incident light energy (lumens) which could be detrimental to personnel. This release of light energy is referred to as "arc flash."

To counter or minimize effects of primary arcing faults, some present switchgear enclosures are provided with an arcing fault protection system for rapidly shorting and/or grounding the source bus of an electrical distribution system in response to the detection of an arcing fault in the enclosure. This type of arcing fault protection system includes a mechanical switch, a solid-state switch or a hybrid device of both of these types of switches, which quickly diverts current carried on the source bus to a low impedance path, thus effectively extinguishing the primary arcing fault currents present in the distribution system. A low impedance path could be a short to ground or to a three-phase short. An example of a primary arcing fault protection system is an arc terminator described in U.S. Pat. No. 5,933,308 to Garzon, titled "Arcing Fault Protection System For A Switchgear Enclosure."

The damage done to the switchgear during an arcing fault event is a function of the speed at which the arc can be extinguished. One problem with arc terminators of the type identified above is that the operating time can be relatively slow, e.g., about 5 milliseconds. During that time, potential damage to the equipment and personnel can occur.

IEEE 1584 shows methods of calculating arc flash energies using time as one of the variables. Prior testing, including tests done in conjunction with U.S. Pat. No. 5,933,308 to Garzon, titled "Arcing Fault Protection System For A Switchgear Enclosure," indicates that equipment damage is prevented when the time to shunt the primary arcing fault is less than 5 milliseconds.

Another type of arcing fault protection system uses an ablative plasma gun with gap electrodes on opposite ends of a chamber of ablative material. The gun injects ablative plasma into a gap between electrodes, reducing the gap impedance sufficiently to initiate a secondary arc between the electrodes that quickly absorbs energy from the primary arc fault and activates a circuit breaker. This quickly extinguishes the primary arcing fault and protects the electrical circuit. This device develops an arc in gas, which limits its lifespan, especially for high-voltage applications, by the progressive loss of insulation properties. A more detailed explanation of this type of device is described in U.S. Patent Application Publication No. 2008/0253040 to Asokan et al., titled "Ablative Plasma Gun". In general, the use of either mechanical, or electrical, or chemical or other means, or a combination of these, to create an electrical short circuit (low impedance path) between terminals to provide an alternate current conduction path is referred to as "crowbarring."

Although the operating time of the "arcing crowbar" device described immediately above is relatively faster than the operating time of a completely mechanical crowbar device arc terminator, one problem associated with this "arcing crowbar" device is that it fails to include a redundant system as a back-up. Another problem with this ablative type of "arcing crowbar" device is that it has a limited lifespan, wherein material essential for operation of the device is lost each time the gun fires. Furthermore, as essential material is lost, the impedance of the arc diverting path may increase over time, with the number of operations. Consequently, the likelihood increases that the path of lowest impedance may shift back to the primary arcing fault which, essentially, could cause the "arcing crowbar" device to fail.

What is needed, therefore, is a high-speed switch for an arcing fault protection system that addresses the above-stated and other problems.

SUMMARY

In one embodiment, a high-speed arc terminator for an electrical power distribution system includes a sealed, evacuated housing, and a controllable mechanical switch having first and second electrically conductive contacts enclosed within the housing and adapted to be coupled to the power distribution system outside the housing. At least one of the contacts is movable between an open position in which the contacts are separated by a vacuum gap, and a closed position in which the contacts engage each other, and an operating mechanism is provided for moving the at least one movable contact between the open and closed positions. An arcing fault detector produces a control signal in response to the detection of an arcing fault, and the operating mechanism is responsive to the control signal for moving the at least one movable contact to the closed position. A trigger conductor extends into the housing and has an exposed end near the cathodic contact when the contacts are in the open position. A high-voltage source is controllably coupled to the trigger conductor for supplying a high-voltage pulse to the trigger conductor in response to the detection of an arcing fault. The high-voltage pulse produces an arc between the trigger conductor and the cathodic contact, which helps to establish a secondary arc within the gap between the contacts, to shunt fault current from the arcing fault in the main electrical circuit, through the gap, from one of the contacts to the other, before the contacts engage each other. The shunting of the fault current by the secondary arc, produced with assistance from the trigger conductor, suppresses the arc produced by the arcing fault, limiting the generation of gases at high pressures and/or temperatures, thereby protecting the switchgear equipment from damage and personnel from harm.

Initiation of the secondary arc occurs after the detection of an arcing fault, within about 500 microseconds, i.e., 0.5 milliseconds, but before the closure of the mechanical contacts, which typically occurs about 4.5 milliseconds after the detection of an arcing fault. The timing of detection and firing of the trigger arc and activation of a coil to close the mechanical contacts will vary, but will not exceed 0.5 milliseconds. As described above, the secondary arc diverts electrical current from the main primary circuit through the two contacts, while the movable contact is in motion toward the stationary contact. The secondary arc is dissipated when the two contacts engage or make contact with each other.

In one implementation, the trigger conductor is a wire that extends through a fixed contact and extends beyond the end surface of the fixed contact toward an opposed movable contact. The end surface of the movable contact forms a cavity that allows the movable contact to telescope over the exposed end of the trigger conductor during movement of the movable contact into engagement with the fixed contact.

The trigger conductor is insulated, except for its exposed tip between the contacts, where the secondary arc is produced. The secondary arc dissipates when the vacuum gap is closed by engagement of the movable contact with the fixed contact.

In another aspect, a method of terminating an arcing fault condition in an electrical power distribution system comprises detecting an arcing fault condition in the power distribution system, and in response to the detection of an arcing fault, initiating the movement of at least one of the contacts in a vacuum bottle having a sealed, evacuated housing and a controllable mechanical switch having first and second electrically conductive contacts enclosed within said housing and coupled to said power distribution system outside said housing. At least one of the contacts is movable between an open position in which the contacts are separated by a gap, and a closed position in which the contacts engage each other to divert fault current in the power distribution system to a low impedance path. A secondary arc is also produced, within the gap between the contacts and before the contacts are engaged, in response to the detection of the arcing fault. The secondary arc shunts fault current from the power distribution system across the gap, from one of the contacts to the other, before and until the contacts engage each other.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings.

FIG. 3 is an enlarged side cross-sectional view of the vacuum bottle of FIG. 1, illustrating a secondary arc across a vacuum gap.

FIG. 4 is a side cross-sectional view of the vacuum bottle of FIG. 1 illustrating a closed position of the mechanical switch.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

Figure 1:
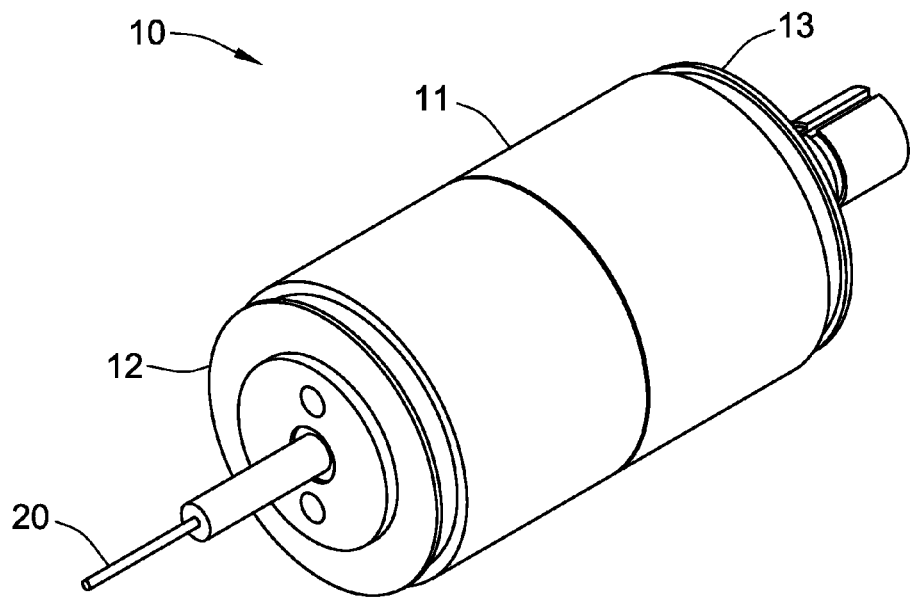
FIG. 1 is a perspective view of a vacuum bottle.

Referring to FIG. 1, a vacuum bottle for an electrical distribution system has a sealed, evacuated housing 10 for enclosing internal components, including a mechanical switch that can be automatically closed in response to the detection of an arcing fault, to divert fault current to a low impedance path and thus extinguish the arc. The housing 10 includes a body 11 that is typically made of an insulating ceramic material hermetically sealed to a pair of end caps 12 and 13. The sealed cylindrical housing 10, sometimes referred to in the industry as a "vacuum bottle," is evacuated to create a vacuum of 0.1 Pa or less.

Figure 2:
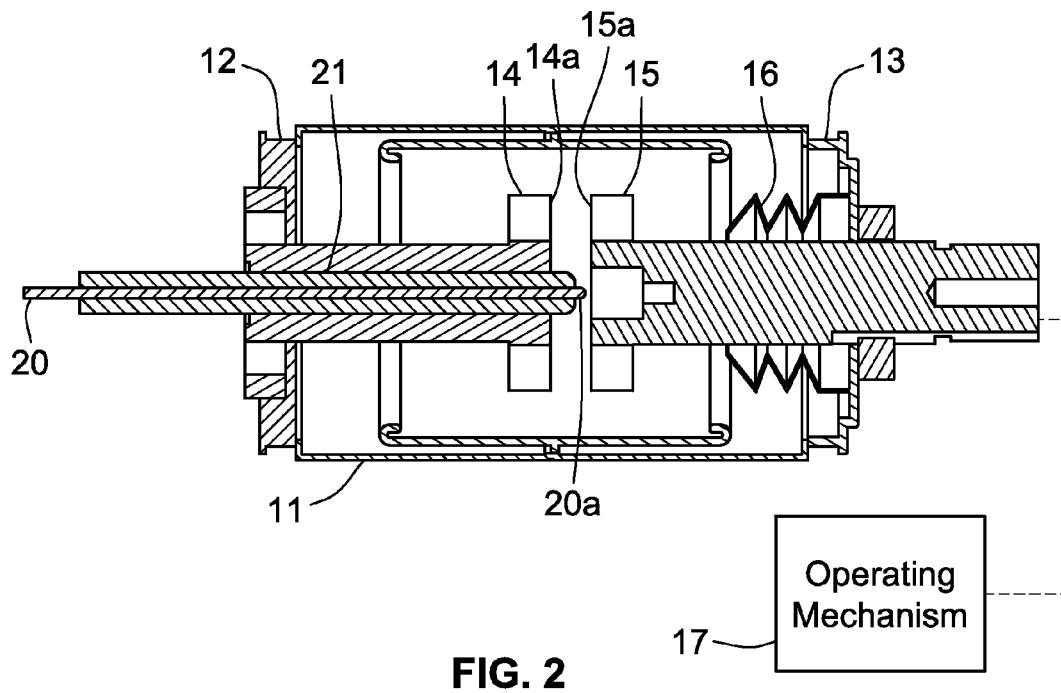
FIG. 2 is a side cross-sectional view of the vacuum bottle of FIG. 1, illustrating an open position of a mechanical switch.

As can be seen in FIGS. 2-4, the mechanical switch inside the housing 10 includes a fixed electrically conductive contact 14 that extends through, and is hermetically sealed to, the first end cap 12, terminating in the central region of the cylindrical body 11. The switch also includes a movable electrically conductive contact 15 that extends through, and is hermetically sealed to, the second end cap 13, and is mounted for axial movement along the body 11. To maintain the hermetic seal during movement of the movable contact 15, the seal includes a flexible bellows 16 that has one end sealed to the end cap 13 and the other end sealed to the movable contact 15. The bellows 16 can expand and contract while maintaining the seals at opposite ends of the bellows.

In its retracted position, shown in FIGS. 2 and 3, the inner end of the movable contact 15 is spaced away from the opposed inner end of the stationary contact 14 by a space that is referred to as the "vacuum gap." This is the "open" condition of the switch. When the movable contact 15 is moved to its advanced position, shown in FIG. 4, the inner end 15a engages the opposed end surface 14a of the fixed contact 14, which is the "closed" condition of the switch. An operating mechanism 17, shown in FIG. 2 (e.g., as described in U.S. Pat. No. 5,933,308) is coupled to the movable contact 15 outside the housing 10 for moving the movable contact 15 back and forth axially, between its open (retracted) and closed (advanced) positions. For this application, the switch is normally in its open condition, and the operating mechanism 17 is actuated to advance the movable contact 15 to its closed position in response to the detection of an arcing fault, to divert the fault current to a low-impedance path. After the fault has been cleared, the operating mechanism 17 is actuated to retract the movable contact 15 to its open position to resume normal operation.

Vacuum bottles of the type described thus far have been in use for many years, and the switch in such vacuum bottles typically closes, and thus extinguishes the fault arc, in less than 5 milliseconds after the occurrence of an arcing fault. Specifically, an arcing fault is typically detected within 0.5 milliseconds after the fault occurs, and then the response time of the operating mechanism to close the contacts is about 4.5 milliseconds.

To reduce the time required to extinguish the arc, the fixed contact 14 is equipped with a trigger conductor 20 (see FIGS. 2-4) that helps the initiation of a secondary arc within the housing 10 before the operating mechanism 17 has responded to the detection of an arcing fault. This secondary arc is generated within the vacuum gap between the opposed surfaces 14a and 15a of the fixed and movable contacts 14 and 15, and has the effect of shunting a portion of the fault current through the vacuum gap before and until the mechanical contacts 14 and 15 engage each other. This is the same shunt path formed by the mechanical contacts 14, 15 when they close, but the immediate shunting effect of the secondary arc, before the contacts have closed, significantly reduces the time required to extinguish the fault arc. In the illustrative device, the trigger conductor is in the form of a wire, but it will be understood that other forms of conductors can be used in place of the wire.

In FIGS. 2-4, the trigger conductor 20 extends through an axial hole 21 bored axially through the fixed contact 15, with the distal end 20a of the trigger conductor extending slightly beyond the end surface 14a of the fixed contact 14, so that the exposed end of the trigger conductor is only slightly spaced from the end surface 15a of the movable contact 15. Thus, an initial trigger arc can be produced, by applying a high-voltage pulse to the trigger conductor 20, between the end of the trigger conductor 20 and the surface 14a or 15a, and this trigger arc, as depicted by the arc 22 in FIG. 3, will initiate the secondary arc between the surface 14a and the opposed surface 15a of the movable contact 15. The trigger conductor is positioned to produce a trigger arc between it and either of the main contacts 14a or 15a. For example, in the illustrative embodiment in FIG. 3, an effective secondary arc can be produced by supplying the trigger conductor 20 with a high-voltage pulse. The trigger conductor 20 is surrounded by insulation 23, except for the exposed end 20a of the trigger conductor, to prevent contact or arcing at other locations along the length of the trigger conductor 20.

The end of the movable contact 15 opposed to the exposed end 20a of the trigger conductor 20 forms a cavity 24 that allows the movable contact 15 to telescope over the distal end portion of the trigger conductor 20 until the annular end surface 15a around the cavity 24 comes into engagement with the end surface 14a of the fixed contact 14. The cavity 24 has a diameter larger than that of the insulated trigger conductor 20, so that the secondary arc is maintained until the two contacts 14, 15 engage each other. After the two contacts 14, 15 are engaged, they provide a relatively low impedance path for the fault current compared to the main arc fault path, divert arc fault current into this low impedance path, and thereby extinguish the arc fault.

Figure 5:
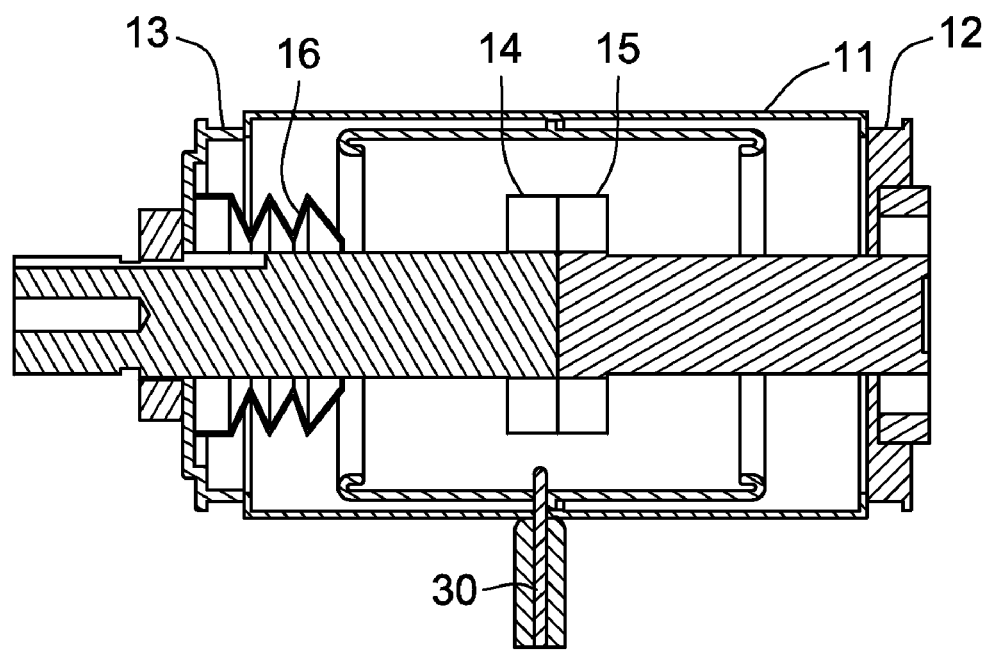
FIG. 5 is a side cross-sectional view of a vacuum bottle illustrating an alternative position of a trigger conductor with the mechanical switch in a closed position.
Figure 6:
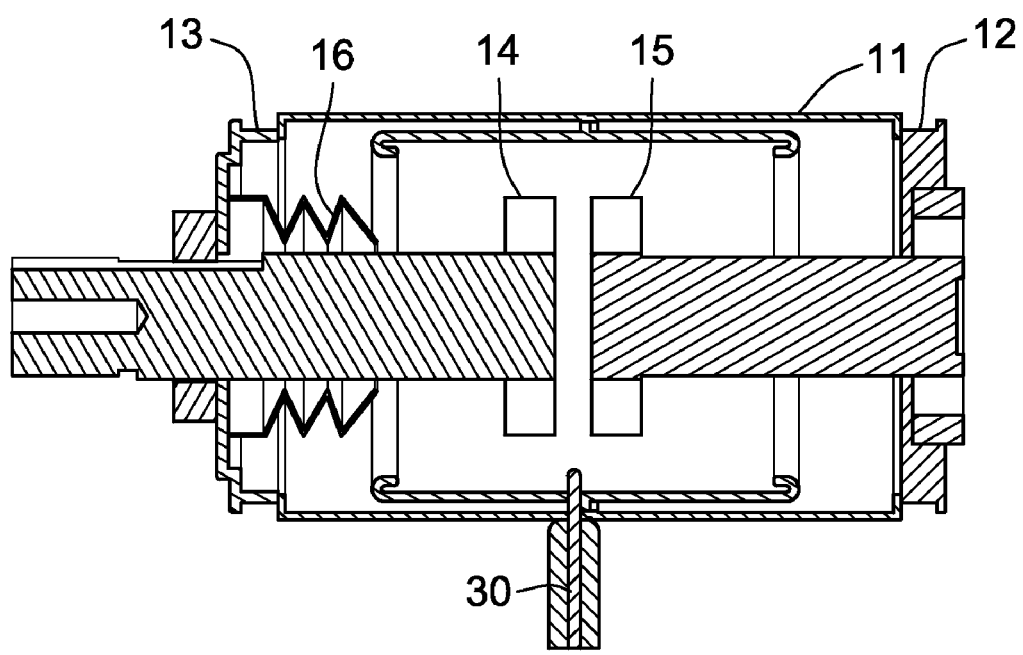
FIG. 6 is the side cross-sectional view of FIG. 5 with the mechanical switch in an open position and illustrating a secondary arc across a vacuum gap.

A modified embodiment of the vacuum bottle is shown in FIGS. 5 and 6. In this embodiment, a trigger conductor 30 extends into the housing 10 along a radial path rather than an axial path. The distal end 30a of the trigger conductor is positioned adjacent to the gap between the two contacts 14 and 15 so that the application of a high-voltage pulse to the trigger conductor 30 produces the desired secondary arc in the gap, thus producing the same effect described above for the embodiment of FIGS. 2-4. FIG. 5 shows the contacts 14 and 15 in the closed position, and FIG. 6 shows them in the open position.

Figure 7:
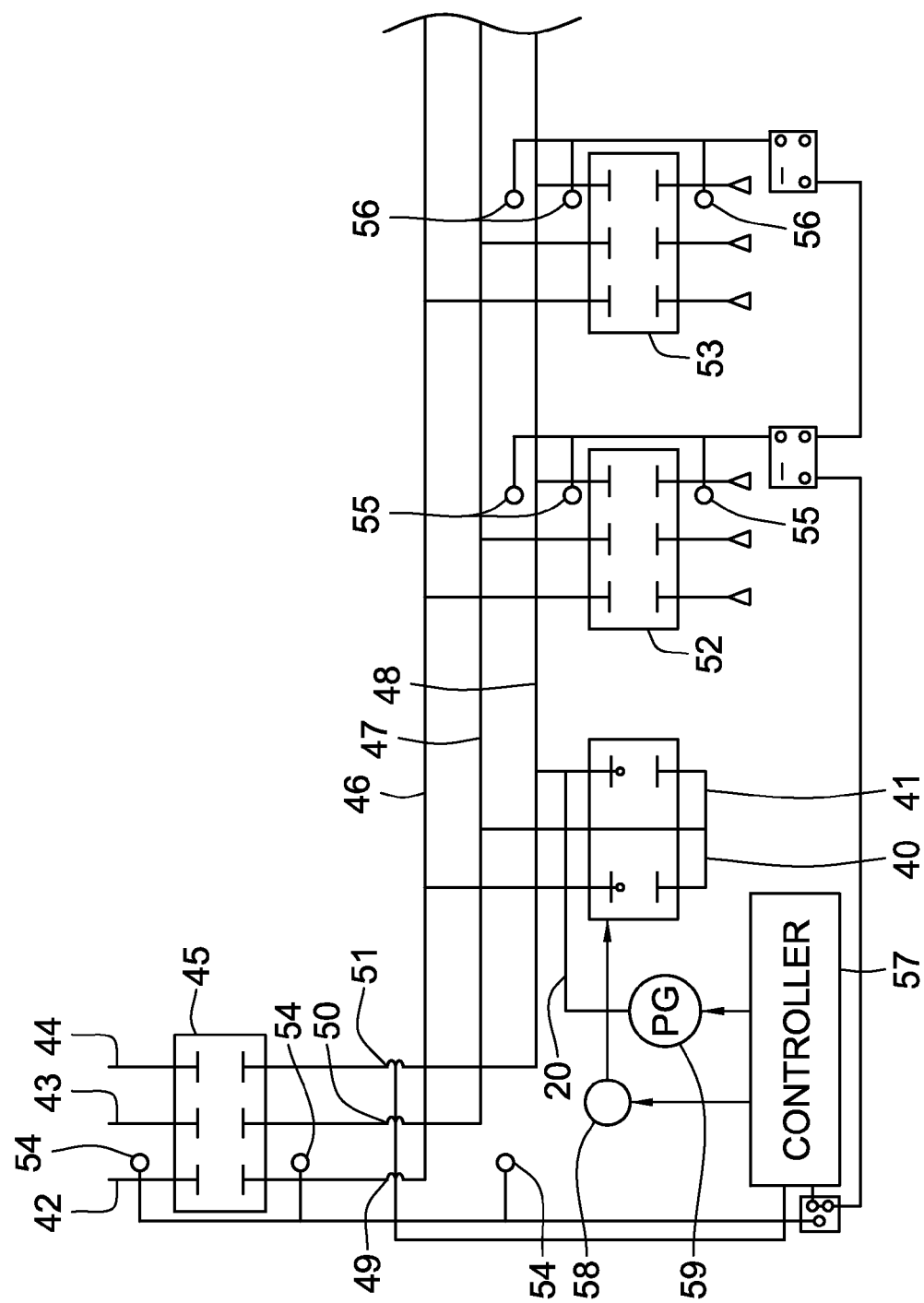
FIG. 7 is an electrical schematic diagram of an electrical power distribution system that includes an arcing fault detection system and a vacuum bottle.

FIG. 7 is an electrical schematic diagram of a three-phase power distribution system equipped with two vacuum bottles 40 and 41. The three phase lines 42, 43 and 44 from a utility are connected through a main circuit breaker 45 to three main buses 46, 47 and 48, one for each phase. The buses 46-48 are equipped with respective current transformers 49, 50 and 51 that are used as part of the arc-fault-detection system. The buses 46-48 are connected through multiple feeder circuit breakers, such as circuit breakers 52 and 53, to multiple feeder circuits for supplying power to different loads. All the circuit breakers 45, 52 and 53 are typically housed in a switchgear enclosure, and optical sensors 54, 55 and 56 are located near the breakers 45, 52 and 53, respectively, to sense the occurrence of an arc produced by an arcing fault.

Signals produced by each of the current transformers 49-51 and the optical sensors 54, 55 and 56 are sent to a controller 57, which uses the signals to detect the occurrence of primary arcing faults (e.g., when both signals exceed preselected thresholds). When a primary arcing fault is detected, the controller 57 causes signals to be sent to (1) a pulse generating circuit 59 which produces a high voltage pulse that is supplied to the trigger conductor 20 to generate the trigger arc, which aids in the formation of the secondary arc between contacts 14 and 15, and (2) to a "repulsion" coil type operating mechanism (see U.S. Pat. No. 5,933,308, Ruben D. Garzon, titled "Arcing Fault Protection System For A Switchgear Enclosure") that closes the contacts 14 and 15.

In the illustrative system of FIG. 7, two vacuum bottles 40 and 41 are provided so that fault current can be shunted from any of the three main buses 46-48 to one of the other buses, thereby diverting the fault current to a low impedance path. The vacuum bottle 40 is connected between buses 46 and 47, and the vacuum bottle 41 is connected between buses 47 and 48. The closing of the contacts in these vacuum bottles completes the suppression of the arc produced by the primary arcing fault. Typically, one or more of the circuit breakers will also be tripped in response to the detection of an arcing fault (though not as fast as the vacuum bottle) so that power is no longer supplied to the power conductors in the region where the fault occurred, until the tripped breakers are reset.

While particular embodiments, aspects, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A high-speed arc terminator for an electrical power distribution system, the arc terminator comprising:
   a sealed, evacuated housing,
   a controllable mechanical switch having first and second electrically conductive contacts enclosed within said housing and adapted to be coupled to said power distribution system outside said housing, at least one of said contacts being movable between an open position in which said contacts are separated by a gap, and a closed position in which said contacts engage each other, to divert fault current in said power distribution system to a low impedance path when an arcing fault is detected,
   a trigger conductor extending into said housing and having an exposed end near said gap between said contacts when said contacts are in said open position, and
   a high voltage source controllably coupled to said trigger conductor for supplying a high-voltage pulse to said trigger conductor in response to the detection of an arcing fault, said high-voltage pulse producing a secondary arc between said trigger conductor and at least one of said first and second conductive contacts within said gap to shunt fault current from said power distribution system across said gap, from one of said contacts to the other, before said contacts engage each other.

2. The high-speed arc terminator of claim 1 which includes an arcing fault detector that produces a control signal in response to the detection of an arcing fault for moving at least one movable contact to said closed position.

3. A high-speed arc terminator for an electrical power distribution system, the arc terminator comprising:
a sealed, evacuated housing,
a controllable mechanical switch having first and second electrically conductive contacts enclosed within said housing and adapted to be coupled to said power distribution system outside said housing, at least one of said contacts being movable between an open position in which said contacts are separated by a gap, and a closed position in which said contacts engage each other, to divert fault current in said power distribution system to a low impedance path when an arcing fault is detected,
a trigger conductor extending into said housing and having an exposed end near said gap between said contacts when said contacts are in said open position, and
a high voltage source controllably coupled to said trigger conductor for supplying a high-voltage pulse to said trigger conductor in response to the detection of an arcing fault, said high-voltage pulse producing a secondary arc within said gap to shunt fault current from said power distribution system across said gap, from one of said contacts to the other, before said contacts engage each other,
said first and second contacts having opposed surfaces, and said trigger conductor extending through said first contact with the end of said conductor extending beyond the end surface of said first contact opposing said second contact.

4. The high-speed arc terminator of claim 1 in which said trigger conductor is insulated except for said exposed end.

5. The high-speed arc terminator of claim 3 in which said surface of said second contact forms a cavity that allows said second contact to telescope over said exposed end of said trigger conductor during the moving of at least one movable contact to said closed position.

6. high-speed arc terminator for an electrical power distribution system, the arc terminator comprising:
a sealed, evacuated housing,
a controllable mechanical switch having first and second electrically conductive contacts enclosed within said housing and adapted to be coupled to said power distribution system outside said housing, at least one of said contacts being movable between an open position in which said contacts are separated by a gap, and a closed position in which said contacts engage each other, to divert fault current in said power distribution system to a low impedance path when an arcing fault is detected,
a trigger conductor extending into said housing and having an exposed end near said gap between said contacts when said contacts are in said open position, and
a high voltage source controllably coupled to said trigger conductor for supplying a high-voltage pulse to said trigger conductor in response to the detection of an arcing fault, said high-voltage pulse producing a secondary arc within said gap to shunt fault current from said power distribution system across said gap, from one of said contacts to the other, before said contacts engage each other,
said trigger conductor extending through a side wall of said housing generally perpendicular to an axis of motion of at least one movable contact.

7. The high-speed arc terminator of claim 1 in which said trigger arc is produced by said high-voltage pulse within about 0.5 milliseconds after the detection of an arcing fault.

8. The high-speed arc terminator of claim 1 in which the response time of said controllable mechanical switch to close said contacts is a maximum of 4.5 milliseconds after the detection of an arcing fault.

9. A method of terminating an arcing fault condition in an electrical power distribution system, the method comprising
a) providing a vacuum bottle having a sealed, evacuated housing and a controllable mechanical switch having first and second electrically conductive contacts enclosed within said housing and coupled to said power distribution system outside said housing, at least one of said contacts being movable between an open position in which said contacts are separated by a gap, and a closed position in which said contacts engage each other to divert fault current in said power distribution system to a low impedance path,
b) detecting an arcing fault condition in said power distribution system, and in response to said detecting of an arcing fault,
c) producing a secondary arc between said trigger conductor and at least one of said first and second conductive contacts within said gap to shunt fault current from said power distribution system through said gap, from one of said contacts to the other, before said contacts engage each other.

10. The method of claim 9 in which said arc is produced by supplying a high-voltage pulse to a trigger conductor extending into said housing and having an exposed end near said gap between said contacts when said contacts are in said open position.

11. The method of claim 10 in which said trigger conductor is insulated except for said exposed end.

12. A method of terminating an arcing fault condition in an electrical power distribution system, the method comprising
a) providing a vacuum bottle having a sealed, evacuated housing and a controllable mechanical switch having first and second electrically conductive contacts enclosed within said housing and coupled to said power distribution system outside said housing, at least one of said contacts being movable between an open position in which said contacts are separated by a gap, and a closed position in which said contacts engage each other to divert fault current in said power distribution system to a low impedance path, and
b) detecting an arcing fault condition in said power distribution system, in response to said detecting of an arcing fault,
c) producing an arc within said gap to shunt fault current from said power distribution system through said gap, from one of said contacts to the other, before said contacts engage each other,
said first and second contacts have opposed surfaces, and said trigger conductor extending through said first contact with the distal end of said conductor extending beyond the end surface of said first contact opposing said second contact.

13. The method of claim 12 in which said surface of said second contact forms a cavity that allows said second contact to telescope over said exposed end of said trigger conductor during the moving of said at least one movable contact to said closed position.

14. A method of terminating an arcing fault condition in an electrical power distribution system, the method comprising
   a) providing a vacuum bottle having a sealed, evacuated housing and a controllable mechanical switch having first and second electrically conductive contacts enclosed within said housing and coupled to said power distribution system outside said housing, at least one of said contacts being movable between an open position in which said contacts are separated by a gap, and a closed position in which said contacts engage each other to divert fault current in said power distribution system to a low impedance path,
   b) detecting an arcing fault condition in said power distribution system, in response to said detecting of an arcing fault, and
   c) producing an arc within said gap to shunt fault current from said power distribution system through said gap, from one of said contacts to the other, before said contacts engage each other,
said trigger conductor extending through a side wall of said housing generally perpendicular to an axis of motion of at least one movable contact.

15. The method of claim 9 which includes removing electrical power from the line in which said arcing fault was detected, after said contacts engage each other.

16. The method of claim 9 which includes producing a control signal in response to said detecting of an arcing fault for moving said at least one movable contact to said closed position.

17. The method of claim 9 in which said contacts first engage each other about 4.5 milliseconds after said detecting of an arcing fault.

18. The method of claim 9 in which said trigger arc is produced about 0.5 milliseconds after said detection of an arcing fault.

* * * * *